United States Patent [19]

Ewy et al.

[11] 4,093,836
[45] June 6, 1978

[54] ACCELERATION SENSITIVE SWITCH

[75] Inventors: Robert J. Ewy, Olathe; Robert P. Moore, Lawrence, both of Kans.

[73] Assignee: King Radio Corporation, Olathe, Kans.

[21] Appl. No.: 700,501

[22] Filed: June 28, 1976

[51] Int. Cl.[2] .................... H01H 35/14; H01H 67/02
[52] U.S. Cl. .................................. 200/61.53; 335/256
[58] Field of Search ............... 200/61.45 R, 61.45 M, 200/61.48, 61.52, 61.53; 335/256, 266

[56] References Cited

U.S. PATENT DOCUMENTS

| 1,845,848 | 2/1932 | Richards | 200/61.53 |
|---|---|---|---|
| 2,553,708 | 5/1951 | Harmon | 200/61.53 |
| 2,603,726 | 7/1952 | McLean | 200/61.53 |
| 2,930,863 | 3/1960 | Pasieka | 200/61.53 |
| 2,943,493 | 7/1960 | Bosch et al. | 200/61.53 X |
| 2,960,871 | 11/1960 | Ganther et al. | 200/61.53 X |
| 3,023,284 | 2/1962 | Lautzenhiser | 200/61.53 |
| 3,222,554 | 12/1965 | Blomquist | 200/61.53 X |
| 3,381,181 | 4/1968 | Weathers | 335/256 X |
| 3,774,128 | 11/1973 | Orlando | 200/61.45 M |
| 3,836,879 | 9/1974 | Frye | 335/266 X |

*Primary Examiner*—James R. Scott
*Attorney, Agent, or Firm*—Lowe, Kokjer, Kircher, Wharton & Bowman

[57] ABSTRACT

A switch structure detects acceleration in a preselected direction such as, for example, along the pitch axis of an aircraft. The switch has a spring supported mass urged toward a stable centered position within the switch housing. Acceleration displaces the mass such that it trips a spring wire switch mechanism for controlling such avionic devices as the autopilot system of the aircraft. A pair of solenoid coils are wound around the spring mass system on opposite sides of the centered position of the mass. The switch may be preflight tested by successively energizing the solenoid coils to attract the mass toward the centers of the solenoid fields, thereby artifically displacing the mass against the spring wire switches.

3 Claims, 2 Drawing Figures

ACCELERATION SENSITIVE SWITCH

BACKGROUND AND SUMMARY OF THE INVENTION

This invention relates to an acceleration sensitive switch device having particular utility in aircraft instrumentation.

Spring supported masses have long been used in accelerometers and other acceleration sensitive instruments such as those used in aircraft. Similarly, there have been various types of prior art sensing devices developed and used for measuring the deflection or displacement of the mass, either in a continuous fashion or when a preselected acceleration level is reached. Such measurement can be carried out mechanically, electrically, electromechanically, hydroelectrically, or in any other manner that is suitable for the use to which the instrument is put.

In avionics type applications, the acceleration sensitive devices that are used are often switches which are activated when the acceleration exceeds a predetermined level. The acceleration switches are typically connected with the autopilot system of the aircraft in a manner to shut off the autopilot in the event of excessive acceleration in the direction of the pitch axis of the aircraft. Acceleration that exceeds a specified amount thus causes automatic shutoff of the autopilot, and the aircraft is then flown by hand.

The acceleration sensitive switches that are presently available for installation in aircraft and for other uses have not been entirely satisfactory in a number of respects. One problem has been the tendency for such devices to be overly complex and costly. In addition, adjustment of existing switches to a different setting or acceleration level is either not possible or at best difficult and time consuming. Even more importantly with regard to aviation, prior art switches are not capable of being tested effectively prior to each flight in order to determine that they are functioning properly. Therefore, when a malfunction occurs it can only be detected when the aircraft accelerates rapidly during actual flight. This situation is manifestly undesirable, particularly since the reliability of existing devices is lacking somewhat and failures are not uncommon.

At present, it is the usual practice to handle the problem of reliability by providing a number of switch units for each aircraft. The installation of multiple units increases the reliability because it is unlikely that all of the units will fail at the same time. However, even with a multiple unit arrangement, failure of one or all of the switches goes undetected. Significant increases in the cost and complexity are also encountered due to the need for installing several switch units in each aircraft.

It is an important object of the present invention to provide an acceleration sensitive switch device which operates with improved reliability in comparison to existing devices.

Another important object of the invention is to provide a device of the character described that can be quickly and easily tested at any time to determine if it is functioning properly.

An additional object of the invention is to provide, in a device of the character described, a pair of solenoid coils for testing the operability of the switch. The use of solenoid coils to artifically displace the mass of a spring mass system for testing purposes is a unique arrangement which provides effective checking of the switch at any time.

A further important object of the invention is to provide a device of the character described in which the switch mechanisms are improved in reliability and simplified in construction as compared to prior art devices.

Yet another object of the invention is to provide a device of the character described that may be quickly and easily adjusted as to the acceleration lever necessary to trip the switch.

A still further object of the invention is to provide a device of the character described that is simple and economical to construct, install, and maintain.

Other and further objects of the invention, together with the features of novelty appurtenant thereto, will appear in the course of the following description.

BRIEF DESCRIPTION OF THE DRAWINGS

In the accompanying drawings which form a part of the specification and are to be read in conjunction therewith, and in which like reference numerals are employed to indicate like parts in the various views.

DETAILED DESCRIPTION OF THE INVENTION

Figure 1:
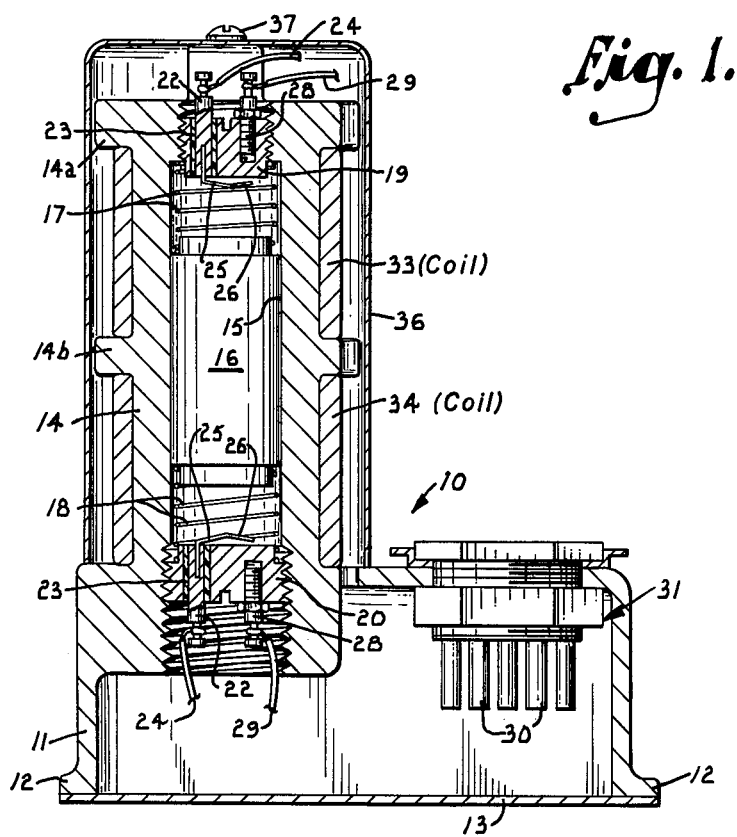
FIG. 1 is a cross sectional elevational view of an acceleration sensitive switch embodying the present invention.

Referring now to the drawing in detail, an acceleration sensitive switch constructed according to the present invention is generally designated by reference numeral 10. The housing of the switch includes a lower base portion 11 which is provided with flanges 12 for mounting to a plate member 13. An upright post 14 is integral with base 11 of the switch housing in upward extension therefrom. Post 14 is substantially cylindrical and is provided with enlarged collars 14a and 14b at its top and center, respectively. A cylindrical bore 15 is formed centrally through post 14. The upper and lower ends of bore 15 are threaded.

A cylindrically shaped mass 16 is located within bore 15 and is slidable up and down therein. In the preferred embodiment of the invention, the mass 16 is "a magnetically soft material" and fits rather closely but slidably within bore 15. Respective upper and lower compression springs 17 and 18 act against the opposite ends of mass 16 in order to urge same toward a stable centered positioned within bore 15, as shown in FIG. 1. The ends of springs 17 and 18 remote from mass 16 bears against respective stop members or plugs 19 and 20 which are threaded into the upper and lower ends of bore 15.

Figure 2:
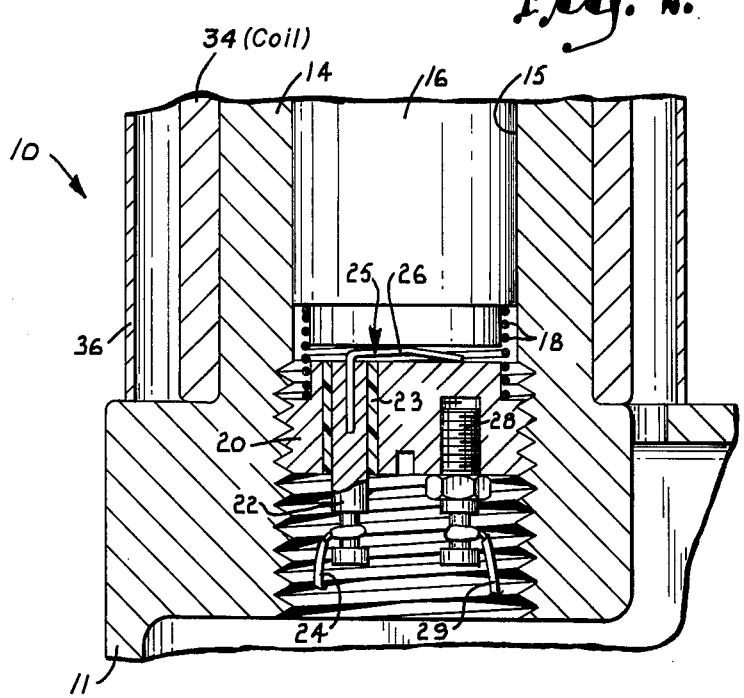
FIG. 2 is a fragmentary cross sectional view on an enlarged scale illustrating a portion of the switch shown in FIG. 1, with the mass displaced downwardly from its centered position to close the lower switch mechanism.

The plugs 19 and 20 are preferably constructed of brass with gold plating. Each plug 19 and 20 is provided with a contact 22 which extends completely through the plug and is surrounded by an insulated sleeve 23. One end of each contact 22 projects out the plug away from bore 15 and connects with a conductor wire 24. The opposite end of each contact 22 is provided with a thin metal wire 25 that is bent to act in the manner of a spring. The base portion of each wire 25 is embedded in the contact 22, and the leg portion of each wire is bent at an angle slightly greater than 90° relative to the base. The leg of each wire 25 is bent back somewhat at a central point thereon so that it presents a crown area 26 against which the mass 16 acts, as will be explained more fully. It is important to note that the leg of each wire 25 is normally located inwardly of its plug 19 or 20. The wires 25 may be displaced against the plugs as shown in FIG. 2, although their spring construction urges them in a direction against the displacement, or toward the position shown in FIG. 1.

Each plug 19 and 20 is provided with a second contact 28 to which a conductor wire 29 connects. Wires 24 and 29 lead to appropriate terminals 30 of a plug member 31 which is screwed or otherwise mounted to the top of base 11.

A pair of solenoid coils 33 and 34 are wound around post 14 to provide a means for preflight testing of the switch 10. The upper coil 33 is wound around the post on the upper portion thereof between collars 14a and 14b. The lower coil 34 is located between the lower collar 14b and the base 11 of the switch housing. Coils 33 and 34 are each connected with a current source (not shown) such that they can be activated to generate electromagnetic fields. It is noted that coils 33 and 34 are concentric with bore 15 and mass 16, and that the fields generated by the coils have centers that are located respectfully above and below the centered position of the mass along the axis of bore 15.

A cover 36 is fit around post 14 outwardly of the solenoid coils 33 and 34. Cover 36 is secured to the switch housing by screw 37.

In use, the switch 10 is installed in an aircraft with post 14 and mass 16 oriented vertically such that the acceleration axis of the switch is oriented vertically. The switch is therefore sensitive to acceleration with respect to the pitch axis of the aircraft. The plug member 31 is connected with the autopilot system of the aircraft so that the wires 24 and 29 are able to shut down the autopilot, as will be explained. A switch (not shown) mounted on the control panel of the aircraft preferably controls the application of current to the solenoid coils 33 and 34.

If the aircraft should accelerate relative to the pitch axis, the force of the acceleration acting on mass 16 tends to move it up or down, depending upon the direction of the acceleration. When the acceleration reaches a sufficient level, the mass 16 moves up or down against the force of springs 17 and 18 to engage the crown portion 26 of the corresponding wire 25. This action of mass 16 bends wire 25 such that its free end is moved into contact with its plug as shown in FIG. 2. The wire 25 is then grounded out against the plug which is in turn grounded to the switch housing. Therefore, the switch closes and since the switch wires 24 and 29 are connected with the autopilot system of the aircraft, the autopilot, the autopilot is turned off. In this manner, the switch 10 is able to detect when the aircraft acceleration in the pitch direction exceeds a preselected level.

When the aircraft has been stabilized and its acceleration decreased adequately, springs 17 and 18 move the mass 16 back to its stable centered position (FIG. 1). Wire 25 is thereby released and its spring construction moves it away from its plug and returns it to the position shown in FIG. 1. The switch is thus opened automatically when the acceleration decreases sufficiently to move mass 16 away from wire 25.

The switch 10 can be quickly and easily tested for proper functioning prior to each flight of the aircraft. To accomplish such preflight testing, the pilot simply activates the upper and lower solenoid coils 33 and 34 in succession. When the upper coil 33 is energized, its electromagnetic field is centered above the centered position of mass 16. The mass is therefore drawn upwardly with its center attracted toward the center of the field created by the energized solenoid coil 33. However, before mass 16 is centered within coil 33, the mass contacts the upper wire 25 and shorts it against the upper plug 19, as earlier described. The switch is thereby closed and the pilot can verify this by verifying that the autopilot system goes off. The upper coil 33 is then deenergized and the lower coil 34 is energized. Mass 16 is attracted downwardly toward the center of the field created by coil 34, but the lower wire 25 is contacted before the mass can reach a centered position within the lower coil 34. The lower switch is thus closed to again turn off the autopilot.

Accordingly, the switch 10 can be preflight tested to assure that it will function as intended if excessive acceleration in the pitch direction occurs during actual flight. It is noted that the extent of acceleration required to trip the switches of which wires 25 are a part depends on the position of the two plugs 19 and 20. Therefore the threaded nature of plugs 19 and 20 is important because it permits them to be quickly and easily adjusted as to their distance from the centered position of mass 16 in order to vary the switch setting. It is contemplated that the switch will be calibrated such that plugs 19 and 20 can be adjusted to accurately set the switch at various acceleration levels.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An acceleration sensitive device comprising:
   a housing having a spool-type post with a bore;
   a ferromagnetic mass supported within said bore for movement therein along an axis of acceleration;
   a pair of springs engaging said housing and opposite ends of said mass in a manner to resiliently urge said mass toward a preselected stable position along said axis of acceleration, said mass being displaceable in both directions along said axis of acceleration in response to acceleration and deceleration in the direction of said axis;
   indicating means providing an indication of the displacement of said mass and the direction of displacement from said stable position; and
   test means for displacing said mass from its stable position independently of acceleration to test the device, said test means including a pair of conductive coils wound concentrically about said axis of acceleration between opposite ends of said post and arranged to provide respective fields having centers located along said axis on opposite sides of said stable position, whereby application of current to the respective coils acts to displace said mass in opposite directions from its stable position independently of acceleration forces.

2. The invention of claim 1, wherein said indicating means comprises a pair of switch mechanisms disposed along said axis of acceleration on opposite sides of said stable position, each switch mechanism being operable upon engagement by said mass to indicate the displacement there of.

3. The invention of claim 2, including means for adjusting the distance of each switch mechanism from said stable position.

* * * * *